United States Patent [19]

Kardach et al.

[11] Patent Number: 5,276,888
[45] Date of Patent: Jan. 4, 1994

[54] COMPUTER SYSTEM WITH INTERRUPTS TRANSPARENT TO ITS OPERATING SYSTEM AND APPLICATION PROGRAMS

[75] Inventors: James Kardach, San Jose; Gregory Mathews, Cupertino; Cau Nguyen, Milpitas; Sung Soo Cho; Kameswaran Sivamani, both of Sunnyvale; David Vannier; Shing Wong, both of Cupertino; Edward Zager, San Jose, all of Calif.

[73] Assignee: Intel Corporation, Santa Clara, Calif.

[21] Appl. No.: 964,788

[22] Filed: Oct. 22, 1992

Related U.S. Application Data

[63] Continuation of Ser. No. 787,762, Nov. 6, 1991, Pat. No. 5,175,853, which is a continuation of Ser. No. 594,278, Oct. 9, 1990, abandoned.

[51] Int. Cl.$^5$ .......................... G06F 9/46; G06F 12/00
[52] U.S. Cl. .................................... 395/725; 395/375; 364/262.4; 364/263.2; 364/246; 364/246.3; 364/240; 364/232.9; 364/DIG. 1
[58] Field of Search ............... 395/725, 375, 275, 650, 395/800, 425, 775; 371/9.1; 365/230.01

[56] References Cited

U.S. PATENT DOCUMENTS

| | | | |
|---|---|---|---|
| 3,858,182 | 12/1974 | Delagi et al. | 364/200 |
| 4,003,028 | 1/1977 | Bennett et al. | 364/200 |
| 4,025,904 | 5/1977 | Adney et al. | 395/200 |
| 4,080,649 | 3/1978 | Calle et al. | 364/200 |
| 4,294,496 | 10/1981 | Murez | 312/208 |
| 4,398,244 | 8/1993 | Chu et al. | 395/375 |
| 4,488,227 | 12/1984 | Miu et al. | 364/200 |
| 4,636,944 | 1/1987 | Hodge | 364/200 |
| 4,674,089 | 6/1987 | Poret et al. | 371/25 |
| 4,698,748 | 10/1987 | Juzswik et al. | 364/200 |
| 4,792,890 | 12/1988 | Blair et al. | 364/200 |
| 4,839,837 | 6/1989 | Chang | 364/200 |
| 4,907,150 | 3/1990 | Arroyo et al. | 364/200 |
| 4,980,836 | 12/1990 | Carter et al. | 307/31 |
| 4,998,197 | 3/1991 | Kurakazu et al. | 364/200 |
| 5,027,273 | 6/1991 | Letwin | 364/200 |
| 5,063,499 | 11/1991 | Garber | 395/500 |
| 5,081,574 | 1/1992 | Larsen et al. | 395/375 |
| 5,128,943 | 7/1992 | Tulpule et al. | 371/9.1 |
| 5,175,853 | 12/1992 | Kardach et al | 395/650 |

*Primary Examiner*—Gopal C. Ray
*Attorney, Agent, or Firm*—Blakely, Sokoloff, Taylor & Zafman

[57] ABSTRACT

A transparent system interrupt is invoked by the assertion of an electrical signal at an external pin of a microprocessor CPU chip. Upon assertion of this interrupt, the CPU begins program execution in a dedicated RAM area that is inaccessible both to the operating system and all application programs. A set of instructions, which may be unique to the system in which the CPU chip is installed, services the interrupt. Typically, the state of the CPU and associated components in the system immediately prior to assertion of the interrupt will be saved into the dedicated RAM area by the interrupt service routine. Recovery from the interrupt is accomplished upon recognition of an external event that invokes a RESUME instruction causing the CPU and associated components to be restored to exactly the same state that existed prior to the interrupt and in a manner entirely transparent to any program executing at the time of the interrupt.

12 Claims, 2 Drawing Sheets

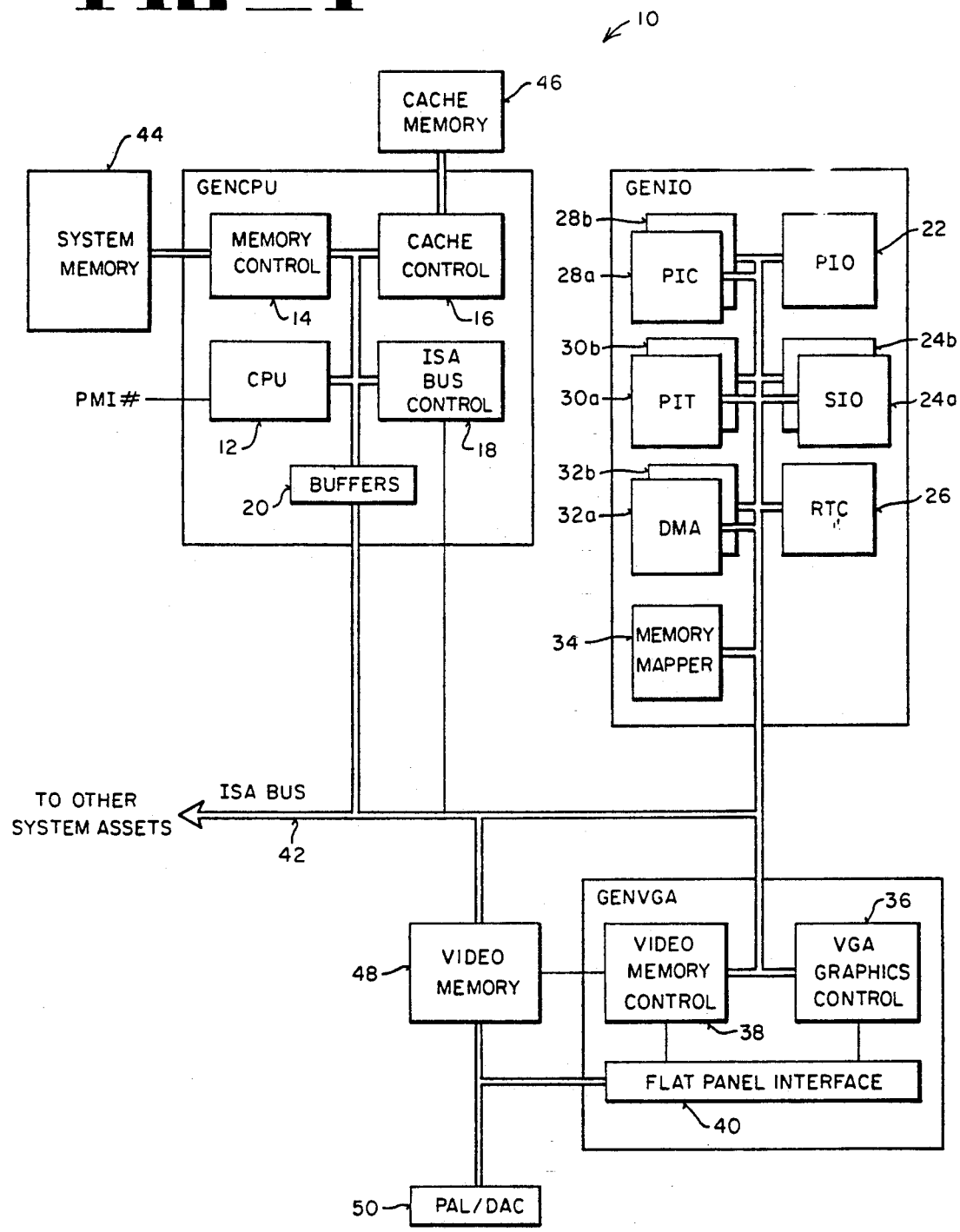

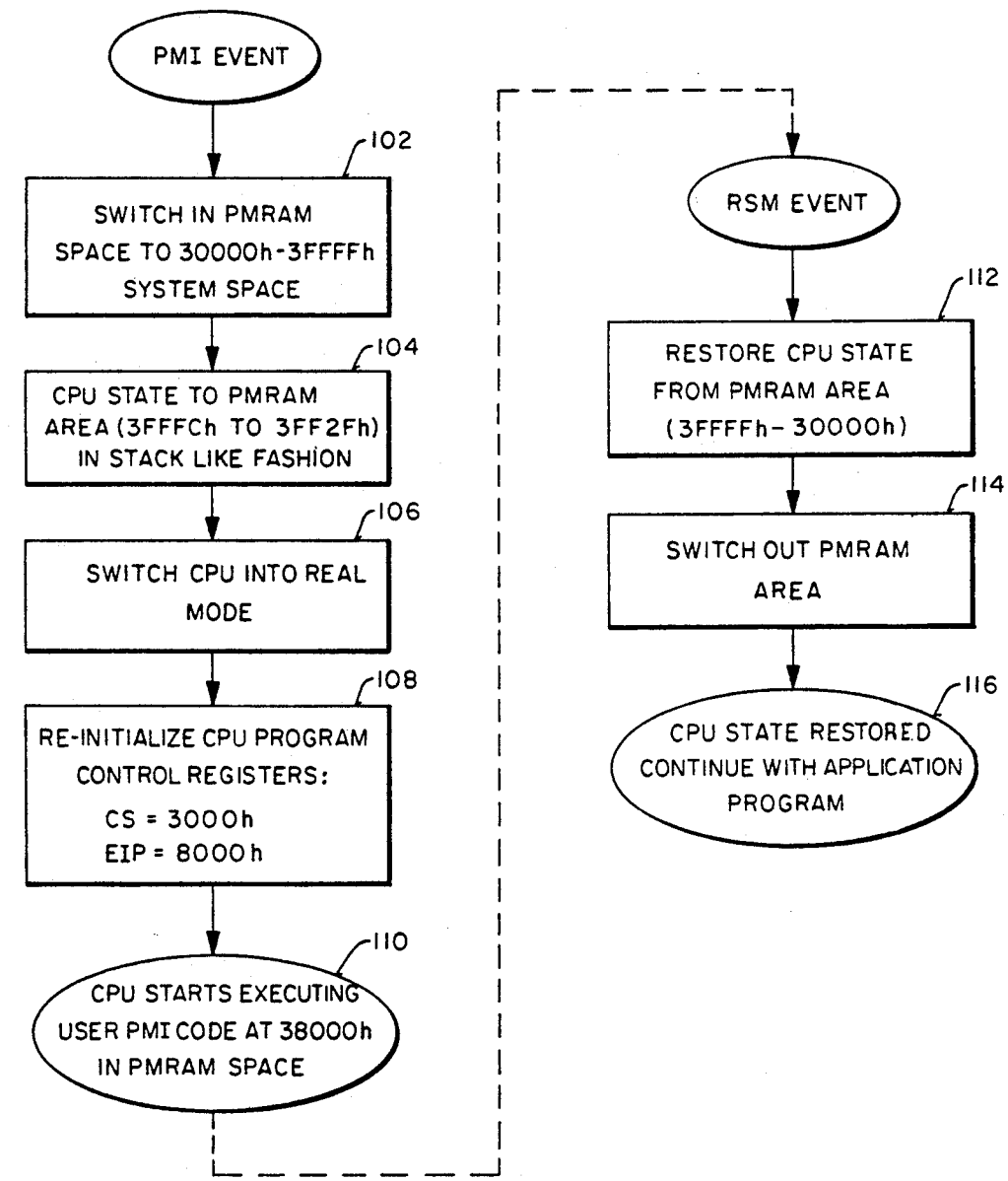

COMPUTER SYSTEM WITH INTERRUPTS TRANSPARENT TO ITS OPERATING SYSTEM AND APPLICATION PROGRAMS

This is a continuation of application Ser. No. 787,762, filed Nov. 6, 1991, now U.S. Pat. No. 5,175,853 which is a continuation of application Ser. No. 594,278, filed Oct. 9, 1990, abandoned.

FIELD OF THE INVENTION

This invention relates to the field of microprocessor architecture, and particularly to a method and apparatus for providing a transparent system interrupt.

BACKGROUND OF THE INVENTION

Current state-of-the-art microprocessors such as the 386 TM family of processors manufactured by Intel Corporation, the corporate assignee of this application, have two fundamental modes of operation: a real mode and a protected mode. The real mode is compatible with earlier processors whose addressing is limited to the real address space. Protected mode, on the other hand, supports virtual addressing.

In such prior art microprocessors, system interrupts are serviced by routines that are typically included in the basic input/output system (BIOS). This approach is generally satisfactory if the processor is operating in the real mode. However, if the processor is in the protected mode of operation, routines resident in BIOS are no longer accessible from an application program. A system interrupt therefore requires an application running in the protected mode to relinquish the system assets and restore real mode operation in BIOS. The state of the machine when the interrupt occurred is lost and the protected mode application program must be reinitialized after the system interrupt is serviced. System interrupts are thus non-transparent to applications running in the protected mode of operation.

Because of the constraints of protected mode operation, an original equipment manufacturer (OEM) of microprocessor systems such as personal computers cannot provide a transparent system interrupt since the OEM controls, at most, the system BIOS. Unlike all known prior art interrupt techniques for microprocessors, the system interrupt implemented by the present invention is entirely transparent to the operating system and other system-level resources of the microprocessor.

SUMMARY OF THE INVENTION

The present invention solves the problem inherent in prior art microprocessors, particularly those that have a protected mode of operation, of the inability of a system integrator or OEM to provide transparent system interrupts. Prior art microprocessor architectures allow operating systems and/or application programs to remap the interrupt structure. Thus, the computer system integrator is unable to provide system-level interrupts that will operate reliably in any operating environment. With the architecture of the present invention, a system-level interrupt is provided that may not be relocated or overwritten by any operating system or application. It is directly controlled by the computer system integrator so as to provide the features and functions that are described below.

The present invention is particularly adapted for use in connection with a microprocessor-based chip set for use in personal computers, especially battery-powered computers of the "notebook" or "laptop" variety. Such a chip set includes a CPU chip, an I/O chip, and, optionally, a graphics chip.

A transparent system interrupt, referred to herein as a System Supervisor Interrupt (SSI) is invoked by the assertion of an electrical signal at an external pin of the microprocessor CPU chip. Upon assertion of this interrupt, the CPU begins program execution in a dedicated RAM area that is inaccessible both to the operating system and all application programs. A set of instructions, which may be unique to the system in which the CPU chip is installed, services the SSI interrupt. Typically, the state of the CPU and associated components in the system immediately prior to assertion of the SSI interrupt will be saved into the dedicated RAM area by the interrupt service routine. Recovery from the SSI interrupt is accomplished upon recognition of an external event that invokes a RESUME instruction causing the CPU and associated components to be restored to exactly the same state that existed prior to the SSI interrupt and in a manner entirely transparent to any program executing at the time of the SSI interrupt.

An important application of the System Supervisor Interrupt is a power management function, whereby the processor and/or other system devices may be effectively shut down during periods of non-use and then re-started without the need to go through a power up routine. In this context, the SSI is referred to as a Power Management Interrupt (PMI). This function is particularly useful in connection with battery-operated computers where power conservation is a primary concern. A key feature of the present invention is that the system may be powered down and later brought back to the same point in an application program at which it was left. Thus, for example, if a computer operator is interrupted while working with an application program, the system can power down to conserve battery life. When the operator returns to use the system, it is restored to the same point in the application program as if the system had been running throughout the intervening period of time. The operator need not take any action to save application program results prior to the interruption, nor need the operator take any action to reload the application program when returning to use the computer.

BRIEF DESCRIPTION OF THE DRAWINGS

FIG. 1 is a functional block diagram of a microprocessor system embodying the present invention.

FIG. 2 is a functional flow diagram of microcode for servicing the system interrupt of the present invention.

DETAILED DESCRIPTION OF THE INVENTION

In the following description, for purposes of explanation and not limitation, specific register structures, mappings, bit assignments, etc. are set forth in order to provide a thorough understanding of the present invention. However, it will be apparent to one skilled in the art that the present invention may be practiced in other embodiments that depart from these specific details. In other instances, detailed descriptions of well known aspects of microprocessor systems are omitted so as to not obscure the description of the present invention with unnecessary detail.

System Overview

The present invention is advantageously employed in a microprocessor design optimized for applications requiring low power consumption and compact size. Such applications particularly include small personal computers of the types commonly referred to as laptops and notebooks. One embodiment of such a microprocessor is briefly described below; however, it is to be understood that the present invention is not limited to this particular microprocessor design, and may be incorporated in virtually any processor design.

Referring to FIG. 1, a processor system 10 is shown. System 10 comprises three main processor components, designated as GENCPU, GENIO and GENVGA. GENCPU is an expanded central processing unit including the CPU 12, a memory controller 14, a cache controller 16, ISA bus control logic 18 and line buffers 20.

In the described embodiment, CPU 12 is essentially a 386 TM SX CPU manufactured by Intel Corporation, the corporate assignee of this invention. Throughout this description, certain terminology relating to the 386 TM SX CPU, such as register names, signal nomenclature, etc., is employed to describe the present invention. Such terminology is understood by practitioners in the field of microprocessor design and will therefore not be explained at length herein. For further information relating to the internal structure of CPU 12, reference is made to the "386 TM SX Microprocessor Hardware Reference Manual" published by Intel Corporation as publication number 240332 and related publications.

GENIO is a single chip input/output unit comprising parallel ports 22, dual serial ports 24a, 24b, real time clock unit 26, dual programmable interrupt controllers 28a, 28b, dual programmable timers 30a, 30b, dual DMA controllers 32a, 32b and memory mapper 34.

GENVGA is a single chip graphics interface comprising VGA graphics controller 36, video memory controller 38 and interface 40 for a flat panel display unit.

All of the processor units communicate with one another and with other system components (such as expansion slots, keyboard controller, disk controllers, etc.) via ISA bus 42.

External to the three main components of system 10 are system memory 44, optional cache memory 46 and optional video memory 48. An optional PAL/DAC unit 50 provides a video interface with a conventional VGA monitor.

Power Management

A particular embodiment of the present invention in the form of a Power Management Interrupt (PMI) will now be described. The PMI allows the execution of system-wide power management routines that are transparent to the operating system and are independent of the operating mode of the processor. As implemented in accordance with the following description, the PMI allows power management software, resident in the system BIOS or in device drivers that are shipped with the system in which the microprocessor is installed, to be executed in a manner that is entirely transparent to the software application, the operating system and the operating mode of the processor. This is in contrast to conventional terminate and stay resident (TSR) routines of the prior art. The PMI is serviced in an operating environment that underlies the operating system and is therefore always accessible regardless of the operating system installed in the processor or the application that may be running when PMI is invoked.

In the described embodiment, one function implemented by PMI is a suspend/resume function. Suspend/resume comprises a process wherein an internal or external event indicate to the computer system that it will be inactive for some extended period of time. For example, such an event may comprise an operator's action of closing the computer case or lid or it may comprise the expiration of an event timer In response to the detected event, the computer selectively powers down to a low power consumption mode. In response to a second event, such as the operator's opening of the computer case or lid, the computer system is automatically restored to the application program running at the time that the first event was detected.

Although the power management function is particularly useful for conserving power in a battery-operated computer system, it also has applications in desktop systems where power conservation is not a primary concern. In this regard, the process of bringing up and shutting down an operating system is often lengthy The present invention allows an operator to turn "off" a computer system without shutting down the operating system. Likewise, the operator can turn the computer system "on" without having to go through the initialization process of the operating system.

In a variation of the suspend/resume function, a standby mode may be entered when the computer system is on but has remained idle for some predetermined period of time When time-out occurs, a PMI is invoked placing the system in a minimum power consumption mode. In response to an event, such as an operator action, the system is restored to the operating mode by the resume procedure.

An I/O trap function is utilized to trap accesses to power-managed devices within the computer system. As with the suspend/resume function, such trapping is transparent to both the operating system and application program. For example, a hard disk is a relatively high power consumption device. If the computer system is not using the hard disk, power thereto may be removed as a means for conserving power. When an I/O access to the hard disk is requested, a PMI is generated. The PMI processing routine then reapplies power to the disk drive, reinitializes it and restores program operation at the I/O instruction.

The PMI implementation in GENIO provides the ability to define up to six I/O mapped active devices and monitor system activity to these devices. When no system activity to one of these devices has occurred for a predetermined length of time, the GENIO will indicate to the GENCPU (through the PMI) to take action, i.e., to put the device into a standby mode or shut power off.

GENIO likewise has the ability to define up to six I/O mapped disabled devices and monitor accesses to these devices When a device has been disabled, by being placed into standby mode or a power off condition, the GENIO can monitor accesses up to six of these devices. When an application tries to access one of these devices, the GENIO will indicate to the GENCPU (through the PMI) to reinitialize the device, and restart the I/O instruction.

In a preferred embodiment, the present invention is implemented by means of three enhancements to the conventional 386 TM architecture:

1. A new interrupt called the System Supervisor Interrupt (SSI), or, in the specific application described herein, the Power Management Interrupt (PMI). This interrupt is of a higher priority than the existing non-maskable interrupt (NMI), and is not maskable. Through this PMI interrupt, power management software supersedes the entire 386 TM protection mechanism
2. A special system transparent memory area referred to as Power Management RAM or PMRAM.
3. A new instruction to return from the PMI called the RESUME instruction. In the described embodiment, this instruction is assigned the operation code OFAAh.

The PMI can only be activated through hardware which must create a falling edge signal on the PMI# pin of CPU 12. When a PMI is recognized by the CPU, a process very similar to NMI recognition in a conventional 386 TM CPU, the processor begins execution of the PMI service routine in PMRAM. As illustrated in FIG. 2, when the GENCPU executes a PMI the following actions automatically occur:

1. At step 102, the GENCPU switches in the PMRAM into system memory space and hides the memory normally located in this area.
2. At step 104, the GENCPU saves its context to the PMRAM area starting at the address 3FFFFh and proceeding down in a stack like fashion.
3. At step 106, the GENCPU switches into the real mode of operation.
4. At step 108, the GENCPU reinitializes the CPU program control registers, setting the Code Segment (CS) to 3000h and the Instruction Pointer (EIP) to 8000h.
5. At step 110, the GENCPU jumps to the absolute address 38000h and begins executing OEM-installed code. At this point the power management interrupt service routine has complete control of the system.

PMRAM

The PMRAM area is normally hidden from system memory. When enabled (through either a PMI execution or by setting bit 3 in the OMDCR register), the PMRAM area can be accessed by generating memory accesses through the PMRAM window of 030000h to 03FFFFh. This window is automatically redirected by the GENCPU to the physical PMRAM, which may be located in any one of several places. The physical PMRAM area is selectable by the system integrator and can be located either on the AT-BUS (for high security systems where the code would reside in ROM), or in system memory space 44 controlled by the on-board Memory Controller Unit 14.

When the PMRAM area space is enabled, the following actions are performed by the GENCPU automatically:

1. Any DMA or master accesses to the space from 30000h to 3FFFFh are automatically directed to the correct physical memory locations.
2. The area of memory from 30000h to 3FFFFh is made non-cacheable.
3. The GENCPU will automatically direct CPU accesses into the PMRAM window (from 30000h to 3FFFFh) to the corresponding physical memory locations.

Tables 1 and 2 illustrate the mapping of the GENCPU state dump into PMRAM. The dump starts at 3FFFFh continuing down in a stack like fashion For example, the first two registers stored are CR0 and CR3 respectively They are stored as shown in table 1:

TABLE 1

| Address | Contents |
| --- | --- |
| 03FFFFh | CR0 4th Byte (bits 31-24) |
| 03FFFEh | CR0 3rd Byte (bits 23-16) |
| 03FFFDh | CR0 2nd Byte (bits 15-8) |
| 03FFFCh | CR0 1st Byte (bits 7-0) |
| 03FFFBh | CR3 4th Byte (bits 31-24) |
| 03FFFAh | CR3 3rd Byte (bits 23-16) |
| 03FFF9h | CR3 2nd Byte (bits 15-8) |
| 03FFF8h | CR3 1st Byte (bits 7-0) |

The complete PMRAM state map is shown in table 2:

TABLE 2

| Address | Contents |
| --- | --- |
| 03FFFCh | CR0 |
| 03FFF8h | CR3 |
| 03FFF4h | EFLAGS |
| 03FFF0h | EIP |
| 03FFECh | EDI |
| 03FFE8h | ESI |
| 03FFE4h | EBP |
| 03FFE0h | ESP |
| 03FFDCh | EBX |
| 03FFD8h | EDX |
| 03FFD4h | ECX |
| 03FFD0h | EAX |
| 03FFCCh | DR6 |
| 03FFC8h | DR7 |
| 03FFC4h | TR (Upper word reserved) |
| 03FFC0h | LDTR (Upper word reserved) |
| 03FFBCh | GS (Upper word reserved) |
| 03FFB8h | FS (Upper word reserved) |
| 03FFB4h | DS (Upper word reserved) |
| 03FFB0h | SS (Upper word reserved) |
| 03FFA8h | ES (Upper word reserved) |
| 03FFA4h | TSS AR (AR bits 8:15, G bit 22 and B/D bit 23. Others reserved) |
| 03FFA0h | TSS BASE (byte granular) |
| 03FF9Ch | TSS LIMIT (byte granular) |
| 03FF98h | IDT AR (AR bits 8:15, G bit 22 and B/D bit 23. Others reserved) |
| 03FF94h | IDT BASE (byte granular) |
| 03FF90h | IDT LIMIT (byte granular) |
| 03FF8Ch | GDT AR (AR bits 8:15, G bit 22 and B/D bit 23. Others reserved) |
| 03FF88h | GDT BASE (byte granular) |
| 03FF84h | GDT LIMIT (byte granular) |
| 03FF80h | LDT AR (AR bits 8:15, G bit 22 and B/D bit 23. Others reserved) |
| 03FF7Ch | LDT BASE (byte granular) |
| 03FF78h | LDT LIMIT (byte granular) |
| 03FF74h | GS AR (AR bits 8:15, G bit 22 and B/D bit 23. Others reserved) |
| 03FF70h | GS BASE (byte granular) |
| 03FF6Ch | GS LIMIT (byte granular) |
| 03FF68h | FS AR (AR bits 8:15, G bit 22 and B/D bit 23. Others reserved) |
| 03FF64h | FS BASE (byte granular) |
| 03FF60h | FS LIMIT (byte granular) |
| 03FF5Ch | DS AR (AR bits 8:15, G bit 22 and B/D bit 23. Others reserved) |
| 03FF58h | DS BASE (byte granular) |
| 03FF54h | DS LIMIT (byte granular) |
| 03FF50h | SS AR (AR bits 8:15, G bit 22 and B/D bit 23. Others reserved) |
| 03FF4Ch | SS BASE (byte granular) |
| 03FF48h | SS LIMIT (byte granular) |
| 03FF44h | CS AR (AR bits 8:15, G bit 22 and B/D bit 23. Others reserved) |
| 03FF40h | CS BASE (byte granular) |

TABLE 2-continued

| Address | Contents |
|---|---|
| 03FF3Ch | CS LIMIT (byte granular) |
| 03FF38h | ES AR (AR bits 8:15, G bit 22 and B/D bit 23. Others reserved) |
| 03FF34h | ES BASE (byte granular) |
| 03FF30h | ES LIMIT (byte granular) |
| 03FED4h-03FF2Fh | reserved |

When in a PMI routine, the PMI handler checks the system for a HALT condition by checking the HALT bit in the CPUWRMODE register. This allows the PMI handler to modify the EIP image in PMRAM and have the application re-execute the HALT instruction after the PMI routine is finished (i.e., when a RESUME instruction is executed) returning the CPU to its previous state transparently.

The RESUME Instruction

The RESUME (RSM) instruction allows the GENCPU to transparently re-enter an application after servicing the PMI. Referring again to FIG. 2, when a RESUME instruction is executed, the following events occur:
1. At step 112, the GENCPU restores its context from the PMRAM.
2. At step 114, the GENCPU switches out the PMRAM area to again make it unavailable as a system asset.
3. At step 116, the operating system and/or application program resumes execution.

There are two main categories of power management functions invoked by a PMI: hardware controlled power management and software controlled power management.

Hardware Controlled Power Management

Hardware controlled power management requires no software support in the PMI service routine. This type of power management is supported in the following ways:
1. The GENCPU will automatically slow its CPU clock to a programmed value when another master has control of the bus or DMA is active. During these periods of time the CPU has little activity, reducing the clock reduces the active power of the GENCPU.
2. The GENCPU keeps the clock to the math co-processor (MCP), if one is installed in the system, at its minimum required frequency until it executes a MCP instruction. The GENCPU will then automatically match the MCP clock, so that the MCP will execute at its highest performance. Additionally, if the GENCPU detects no MCP in the system it automatically stops the clock to the MCP.
3. The GENCPU executes CAS before RAS refresh for all on-board memory refresh cycles.
4. The GENIO can be programmed to automatically stop the clock to the GENCPU when it detects a halt condition.

Software Controlled Power Management

Software controlled power management resides in the PMI service routine. A hardware event triggers the generation of a PMI, and the PMI service routine actively manages the system-wide power consumption through the turning on and off of power monitored devices. The GENIO supports the following types of power management through the control of PMI:
1. Control of the GENCPU's main clock speed.
2. Control of the MCP's idle clock speed.
3. Control of the DMA clock frequency.
4. Control of the keyboard controller's clock.
5. Control of the OSC pin to disable or enable the frequency output.
6. Ability to disable AT-BUS refresh.
7. Control of system power management. Built into the GENIO are two levels of system wide power management. The first level places the system into a "standby" condition and the second level places the system into a "suspend" condition. A standby condition is defined as a condition in which the OS and application are still executing. A suspend condition is defined as entering the minimum power condition in which the system is not executing either the operating system or application. Both of these conditions are recoverable from a RESUME instruction, allowing the system to jump back to the execution of the operating system and application where it was interrupted.
8. Control of the memory controller to continue refreshing system DRAM memory when in a suspend condition.
9. Control of individual power monitored devices via the I/O trap function.
10. The ability to resume from a suspend condition upon the occurrence of an event, such as a preset alarm, the detection of a modem or FAX ring condition, or the assertion of the suspend/resume button.

System Event Registers

There are three system event registers: SYS_EVNT_CFG0, SYS_EVNT_CFG1, and SYS_EVNT_CFG2. These registers enable events that indicate an active system. A number of power management timers are used to measure system idle time. When the timer times out, the system is considered to be idle and power management software should take action. A system event will reload the timer allowing additional time for the active CPU to finish its task. The timers affected by system events are:
1. Global Standby Timer. When this timer expires, the GENIO asserts the PMI# signal (if enabled).
2. Auto Power Off Timer. When this timer expires, the GENIO loads and starts the Global Standby Timer (if enabled).
3. Auto Power Off Warning Timer. When this timer expires, the GENIO asserts the PMI# signal (if enabled).
4. External PMI Warning Timer. When this timer expires, the GENIO asserts the PMI# signal (if enabled).
5. Software Request PMI Warning Timer. When this timer expires, the GENIO asserts the PMI# signal (if enabled).
6. Battery Low Warning Timer. When this timer expires, the GENIO asserts the PMI# signal (if enabled).
7. Suspend/Resume Button Warning Timer. When this timer expires, the GENIO asserts the PMI# signal (if enabled).

I/O Device Base Address Registers

The I/O device base registers consist of twelve 8-bit registers used to define the base addresses for six I/O locations. These locations are used to control two different power management features: The device idle I/O device power management interrupt, and the device trap power management interrupt. Also associated with each of the six I/O base addresses are mask bits that allow defining an I/O range for each of the I/O base addresses. Each I/O range can be from 1 byte to 16 bytes wide.

To support the idle I/O device power management interrupt, an idle device timer is associated with each I/O device range. When the specified idle I/O device timer is enabled, it is loaded with its specified count and starts counting down. Whenever an access occurs to the specified device I/O address range (indicating activity to the device), the associated idle device timer gets reloaded. When an idle device timer expires, an idle device power management interrupt is generated setting the appropriate request bit. The power management software may then decide to remove power from this idle device. To support system wide I/O activity for all six idle timers, an access to the specified area can optionally reload and restart all enabled idle device timers.

To support trapping accesses to disabled or powered off devices, an I/O trap power management interrupt is provided. When enabled, by setting the appropriate I/O trap enable bit, any access to the specified device's I/O address range causes an I/O trap PMI request. The power management software can then reenable and reinitialize the device, and the GENCPU can restart the trapped I/O instruction.

Global Standby Timer and Auto Power Off Timer

A global standby timer is used to indicate a level of system idleness to invoke PMI and enter the standby mode. The timer can be programmed with a 16-bit count, each count representing a 4.096 second time interval, for an idle range from 0 to 268,431.36 seconds. The global standby timer will load and start counting down when the GSTDBY_REQ_EN bit is set while the PM_EN bit is set and the SYS_IN_STDBY bit is cleared. The global standby timer is reloaded anytime an enabled system event occurs. When the global standby timer expires, the GENIO sets the GSTDBY_REQ bit and asserts the PMI# pin active (LOW).

At this time the power management software has the option of putting the system in the standby mode. This mode is user defined, but is normally a mode where the system removes power to all high power devices, initializes the auto power off timer, sets the SYS_0_IN_STDBY bit, and does an I/O read to the stop clock register. When the SYS_IN_STDBY bit is set, the auto power off timer loads and starts counting down. The auto power off timer can be programmed with a 15-bit count, each count representing a 4.096 second time interval, for an idle range from 0 to 134,213.63 seconds. When this timer expires, the GENIO loads the auto power off warning timer and starts it counting. If a system event occurs before the auto power off timer expires, the GENIO will clear the SYS_IN_STDBY bit; disabling the auto power off timers. If the global standby timer enable bit is still set, upon the clearing of the SYS_IN_STDBY bit the global standby timer will reload and start to count down.

When the auto power off warning timer is loaded and starts counting when the HWBTWRNBP_EN is set, the GENIO will generate an alert such as a beep every two seconds to indicate to the user a suspend event is about to take place. When the auto power off warning timer expires, the GENIO will generate a PMI and set the APWR_OFF_SUSREQ bit, in turn causing the HW_SUSREQ bit to go to HIGH. If a system event occurs before the auto power off warning timer expires, the GENIO will clear the SYS_IN_STDBY bit; disabling the auto power off timers. If the global standby timer enable bit is still set, upon the clearing of the SYS_IN_STDBY bit the global standby timer will reload and start to count down.

Local Device I/O Idle Timers

Local device I/O idle timers are used to indicate system activity or activity of a selected device. Each of the six local device I/O idle timers can be programmed to count from 0 to 1044.48 seconds in 4.096 second increments. When a local device I/O idle timer expires, it generates a PMI request to the GENCPU by asserting the PMI# pin LOW. Each local device I/O idle timer will automatically reload when an access occurs to its specified device I/O range, this prevents the local device I/O idle timer from expiring until the device has been idle for the specified time. Optionally, an access to a specified local device I/O range can reload all of the local device I/O idle timers.

Other SSI Functions

The SSI is not restricted to use in connection with power management functions. Examples of other functions that may be implemented with SSI are an uninterruptable power supply, a fast on/off switch, and security features.

An uninterruptable power supply can be implemented in a desktop system using the suspend/resume function of the PMI. A power-sensing circuit determines when a power failure occurs and triggers the SSI. The system enters the suspend condition with all high power consumption devices shut down. In this condition, the system can be easily maintained for an extended period of time with a small lithium battery. When line power is restored, the system is restored to the application running at the time of the power failure by means of the resume procedure.

A similar concept may be employed to implement a fast off/on switch. When the computer system is switched "off", power is removed from all high power consumption devices and the system enters the suspend condition. A small five-volt power supply remains on to maintain the system in the suspend condition. When the computer system is then switched "on", the system is restored immediately to the application program that was running at the time the power was switched "off". As discussed above, this eliminates the need to go through a lengthy boot-up process required by certain operating systems.

The SSI can also be used to implement certain security features. For example, a system that has been left idle for a predetermined period of time would enter a high security mode similar to the STANDBY condition discussed above. An attempt to resume use of the system would require the operator to enter a password, thereby denying use of the system to unauthorized operators. Another security feature could restrict access to certain peripheral devices. As discussed above, access requests to system devices can be used to trigger a SSI. If access to a high security device is requested, the SSI service routine can be used to prompt the operator for a password.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:

1. A computer system comprising:
   (a) memory means having a first memory area for storing a first sequence of instructions having a first associated data set, and a second memory area for storing a second sequence of instructions having a second associated data set, said first memory area being normally mapped as part of a memory space of said computer system whereas said second memory area being normally not mapped as part of said memory space thereby keeping said first sequence of instructions from having access to said second memory area;
   (b) bus means coupled to said memory means for accessing said first and second sequences of instructions and said first and second associated data sets;
   (c) execution means coupled to said bus means for normally executing said first sequence of instructions in a virtual addressing mode and conditionally executing said second sequence of instructions in a real addressing mode, said execution of said first sequence of instructions being suspended when said second sequence of instructions is executed;
   (d) triggering means for triggering an interrupt unmaskable by said first sequence of instructions;
   (e) interrupt means coupled to said trigger means and execution means for detecting said unmaskable interrupt and in response, cause said execution means to suspend execution of said first sequence of instructions, mapping said second memory area into said memory space of said computer system, saving execution state of said first sequence of instructions into said second memory area, and causing said execution means to execute said second sequence of instructions; and
   (f) resumption means coupled to said execution means for causing said execution means to suspend execution of said second sequence of instructions at the direction of said second sequence of instructions, restoring said saved execution state of said first sequence of instructions, unmapping said second memory area from said memory space of said computer system, and causing said execution means to resume execution of said first sequence of instructions.

2. The computer system as set forth in claim 1, wherein, said memory means, said bus means, said execution means, said triggering means, said interrupt means, and said resumption means are disposed on a single VLSI chip.

3. The computer system as set forth in claim 1, wherein,
   said first memory area of said memory means, said bus means, said execution means, said triggering means, said interrupt means, and said resumption means are disposed on a first VLSI chip; and
   said second memory area of said memory means is disposed on a second separate VLSI chip.

4. The computer system as set forth in claim 1, wherein, said triggering means comprises an external pin of a CPU of said execution means.

5. The computer system as set forth in claim 1, wherein, said computer system is battery powered.

6. The computer system as set forth in claim 1, wherein,
   said first sequence of instructions comprises an operating system and at least one application program; and
   said second sequence of instructions comprises an interrupt processing program.

7. A computer system comprising:
   (a) a first memory area for storing a first sequence of instructions having a first associated data set, said first memory area being normally mapped as part of a memory space of said computer system;
   (b) a second memory are for storing a second sequence of instructions having a second associated data set, said second memory area being normally not mapped as part of said memory space thereby keeping said first sequence of instructions from having access to said second memory area;
   (c) an address bus and a data bus coupled to said first and second memory areas for accessing said first and second sequences of instructions and said first and second associated data sets;
   (d) an execution unit coupled to said address and data buses for normally executing said first sequence of instructions in a virtual addressing mode and conditionally executing said second sequence of instructions in a real addressing mode, said execution of said first sequence of instructions being suspended when said second sequence of instructions is executed;
   (e) a triggering mechanism for triggering an interrupt unmaskable by said first sequence of instructions;
   (f) interrupt logic coupled to said trigger mechanism and execution unit for detecting said unmaskable interrupt and in response, causing said execution unit to suspend execution of said first sequence of instructions, mapping said second memory area into said memory space of said computer system, saving execution state of said first sequence of instructions into said second memory area, and causing said execution unit to execute said second sequence of instructions; and
   (g) resume logic coupled to said execution unit for causing said execution means to suspend execution of said second sequence of instructions at the direction of said second sequence of instructions, restoring said saved execution state of said first sequence of instructions, unmapping said second memory area from said memory space of said computer system, and causing said execution means to resume execution of said first sequence of instructions.

8. The computer system as set forth in claim 7, wherein, said first and second memory area, said address and data bus, said execution unit, said triggering mechanism, said interrupt logic, and said resume logic are disposed on a single VLSI chip.

9. The computer system as set forth in claim 7, wherein, said first memory area, said address and data bus, said execution unit, said triggering mechanism, said interrupt logic, and said resume logic are disposed on a first VLSI chip; and said second memory area is disposed on a second separate VLSI chip.

10. The computer system as set forth in claim 7, wherein, said triggering mechanism includes an external pin of a CPU of said execution unit.

11. The computer system as set forth in claim 7, wherein, said computer system is battery powered.

12. The computer system as set forth in claim 7, wherein, said first sequence of instructions comprises an operating system and at least one application program; and said second sequence of instructions comprises an interrupt processing program.

* * * * *

UNITED STATES PATENT AND TRADEMARK OFFICE
CERTIFICATE OF CORRECTION

PATENT NO. : 5,276,888
DATED : January 4, 1994
INVENTOR(S) : James Kardach, Gregory Mathews, Cau Nguyen, Sung Soo Cho, Kameswaran Sivamani, David Vannier, Shing Wong and Edward Zager It is certified that error appears in the above-indentified patent and that said Letters Patent is hereby corrected as shown below:

| | | |
|---|---|---|
| Col. 4, Line 24 | After "lengthy" | Insert --.-- |
| Col. 4, Line 33 | After the first occurance of "time" | Insert --.-- |
| Col. 4, Line 60 | After "devices" | Insert --.-- |
| Col. 5, Line 11 | After "mechanism" | Insert --.-- |
| Col. 6, Line 5 | After "fashion" | Insert --.-- |
| Col. 6, Line 7 | After "respectively" | Insert --.-- |
| Col. 12, Line 22 | Delete "are" | Insert --area-- |

Signed and Sealed this

Twenty-seventh Day of September, 1994

Attest:

BRUCE LEHMAN

*Attesting Officer*   *Commissioner of Patents and Trademarks*